(12) United States Patent
Bailiang (10) Patent No.: US 8,823,734 B1
(45) Date of Patent: Sep. 2, 2014

(54) INDICATING AVAILABILITY OF INDOOR CONTENT ON A DIGITAL MAP

(71) Applicant: Google Inc., Mountain View, CA (US)

(72) Inventor: Zhou Bailiang, Balgowlah (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/053,298

(22) Filed: Oct. 14, 2013

(51) Int. Cl.
- G09G 5/00 (2006.01)
- G06T 1/00 (2006.01)
- G09G 5/34 (2006.01)
- G09G 5/14 (2006.01)
- G06T 17/05 (2011.01)

(52) U.S. Cl.
CPC .. G09G 5/34 (2013.01); G09G 5/14 (2013.01); G06T 17/05 (2013.01)
USPC .......................... 345/619; 345/418; 345/672

(58) Field of Classification Search
CPC ........ G06F 3/0485; G06F 3/048; G06T 17/05
USPC .................... 345/418, 672; 715/799
See application file for complete search history.

(56) References Cited

U.S. PATENT DOCUMENTS

| | | | |
|---|---|---|---|
| 6,563,529 B1 * | 5/2003 | Jongerius | 348/36 |
| 8,368,695 B2 * | 2/2013 | Howell et al. | 345/427 |
| 2006/0164409 A1 * | 7/2006 | Borchardt et al. | 345/419 |
| 2008/0147730 A1 * | 6/2008 | Lee et al. | 707/104.1 |
| 2008/0192053 A1 * | 8/2008 | Howell et al. | 345/427 |
| 2008/0231700 A1 * | 9/2008 | Schultz et al. | 348/144 |
| 2009/0198767 A1 * | 8/2009 | Jakobson et al. | 709/203 |
| 2009/0210388 A1 * | 8/2009 | Elson et al. | 707/3 |
| 2009/0292671 A1 * | 11/2009 | Ramig et al. | 707/3 |
| 2010/0031186 A1 * | 2/2010 | Tseng et al. | 715/786 |
| 2010/0121567 A1 * | 5/2010 | Mendelson | 701/206 |
| 2010/0189312 A1 * | 7/2010 | Nielsen et al. | 382/113 |
| 2010/0211697 A1 * | 8/2010 | Raza et al. | 709/250 |
| 2013/0321400 A1 * | 12/2013 | van Os et al. | 345/419 |
| 2013/0322702 A1 * | 12/2013 | Piemonte et al. | 382/113 |

OTHER PUBLICATIONS

Elson et al; MapCruncher: integrating the world's geographic information; Apr. 2007; ACM SIGOPS; vol. 41, Issue 2; pp. 50-59.*

Hiyoshi et al.; Path Planning Using Indoor Map Data Generated by the Plan View of Each Floor; Jul. 5, 2011; Proceeding of the 25th International Cartographic Conference.*

Bing Maps. Retrieved from the Internet on Dec. 26, 2013: (http://www.bing.com/maps/?FORM=Z9LH2).

* cited by examiner

Primary Examiner — David T Welch
(74) Attorney, Agent, or Firm — Marshall, Gerstein & Borun LLP (57) ABSTRACT

An interactive digital map of a geographic area is provided via a viewport that defines a visible portion of the digital map. The digital map includes a representation of a structure. The viewport is panned relative to the digital map in response to receiving a user request. An indication that indoor map data is available for the structure is displayed in response to determining that the viewport is panning, and the indication is removed in response to determining that the viewport has stopped panning.

20 Claims, 8 Drawing Sheets

INDICATING AVAILABILITY OF INDOOR CONTENT ON A DIGITAL MAP

FIELD OF DISCLOSURE

This disclosure relates to interactive digital maps and, more specifically, to providing indications of available indoor map content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display interactive digital maps. These software applications include special-purpose applications developed specifically to provide mapping, navigation, geographic search, etc., as well as applications configured to provide any content, such as web browsers. For convenience, all such applications are referred to below as "mapping applications." These applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, pan across a map by swiping her finger in the desired direction, zoom in on an area by pinching two fingers together, zoom out on an area by spreading two fingers apart, etc.

In general, a mapping application can display various types of geographic data including topographical data, street data, urban transit information, and traffic data. Geographic data may be schematic or based on photography, such as satellite imagery. At certain zoom levels, a user can operate a mapping application to view a map of an urban area with street names, names of landmarks, etc. The map may include representations of buildings rendered as 2D footprints, 2.5D representations (in which an approximation of the building is rendered by extruding the shape of the building from the surface), or 3D representations, with or without textures.

The mapping application also can display information about the interiors of buildings. This information (or "indoor map data") can include, for example, floor plans, names of occupants, locations of facilities, etc. Moreover, for multi-story buildings, indoor map data can be available for several floors. This information typically is not available for every building on the map. However, when the footprint or the external shell of the building is displayed on a map, it is not immediately apparent whether indoor map data is available for inspection.

SUMMARY

One embodiment of the techniques of the present disclosure is a method in a computing device for indicating availability of indoor map content. The method includes providing, by one or more processors, an interactive digital map of a geographic area via a viewport, where the viewport defines a visible portion of the digital map, and where the digital map includes a representation of a structure. The method further includes panning, by the one or more processors, the viewport relative to the digital map in response to receiving a user request. Still further, the method includes displaying an indication that indoor map data is available for the structure in response to determining that the viewport is panning and removing the indication in response to determining, by the one or more processors, that the viewport has stopped panning.

Another embodiment is a non-transitory computer-readable medium storing instructions for indicating availability of indoor map content, wherein the instructions, when executed by one or more processors, cause the one or more processors to provide an interactive digital map of a geographic area via a viewport that defines a visible portion of the digital map. When the digital map includes a representation of a structure, the instructions further cause the one or more processors to pan the viewport relative to the digital map in response to receiving a user request, determine whether indoor map data is available for the structure and, while the viewport is panning, (i) provide a first representation of the structure on the digital map when indoor map data is available for the structure, and (ii) provide a second representation of the structure on the digital map when indoor map data is unavailable for the structure. After the viewport has stopped panning, the instructions cause the one or more processors to provide the second representation of the structure on the digital map.

Yet another embodiment is a computing device comprising one or more processors, a user interface coupled to the one or more processors, and a memory coupled to the one or more processors and storing instructions for indicating availability of indoor map content. The instructions, when executed by the one or more processors, cause the computing device to (i) display, via a viewport on the user interface, an interactive digital map of a geographic area, where the viewport defines a viewable area of the digital map, and where the digital map includes a visual representation of a structure disposed within geographic area, (ii) pan the viewport in accordance with user input received via the user interface, (iii) display an indication that indoor map data is available for the structure while the viewport is panning, and (iv) remove the indication when the viewport has stopped panning.

DETAILED DESCRIPTION

According to the techniques of this disclosure, a mapping application indicates whether indoor map content is available for structures displayed on a digital map while the viewport (a frame that defines the currently visible portion of a digital map) is moving at a certain zoom level (i.e., panning), and removes the indication when the viewport is no longer moving. Depending on the implementation, the map display application can remove the indication immediately upon detecting that the viewport stopped moving or within a certain controlled period of time after the viewport stopped moving. This technique improves indoor map discoverability while avoiding visual distractions to the user when the viewport is static. The indications may be displayed on the map also according to the zoom level at which the digital map is being viewed. As discussed in more detail below, the mapping application can indicate availability of indoor map data using certain colors, textures, shadow effects, shapes of indoor features, etc. When the user selects the structure with available indoor map data, the mapping application can obtain the indoor map data from a remote or local storage and present the indoor map data within the viewport.

System Overview

Figure 1:
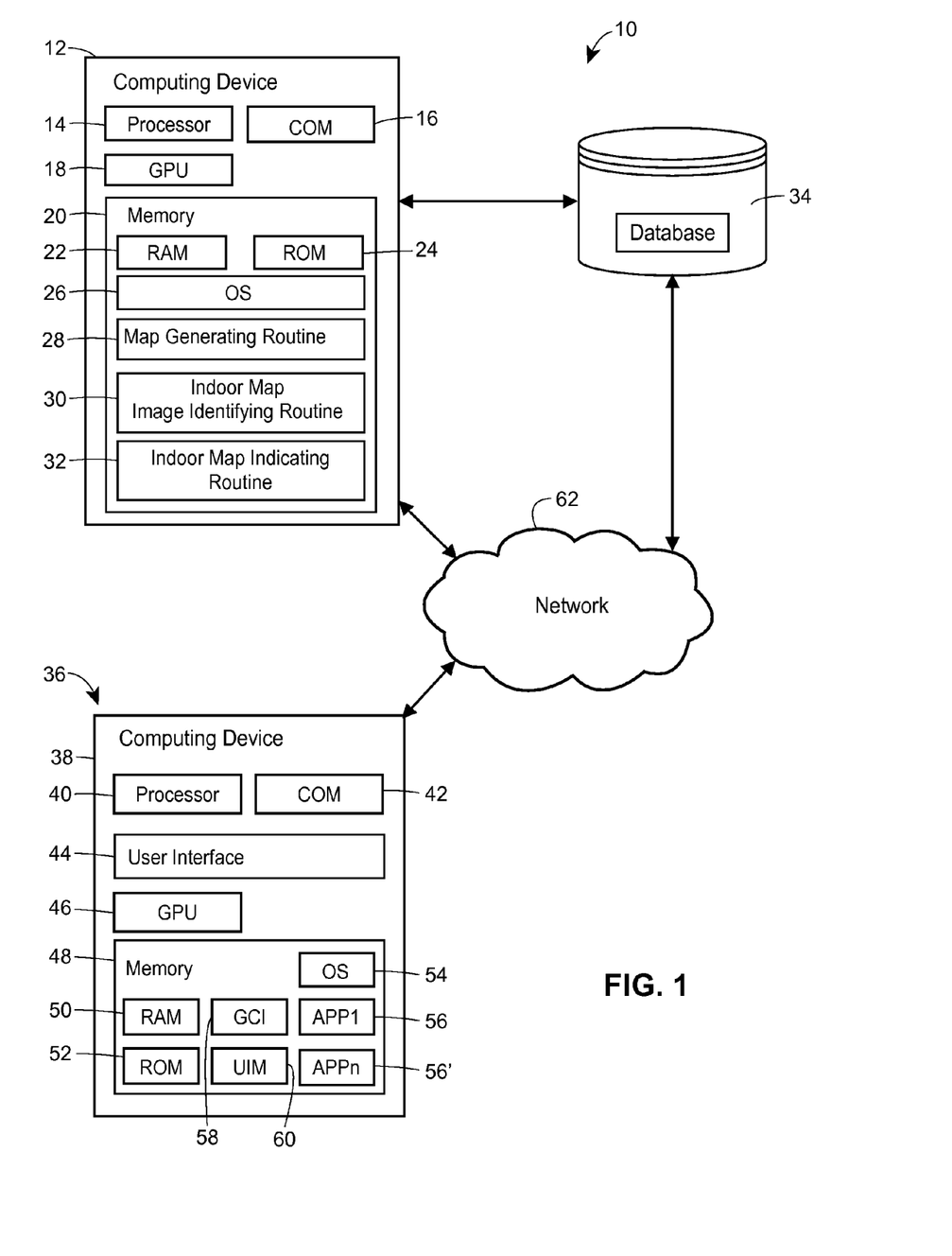
FIG. 1 is a block diagram of an example system that implements the techniques of the present disclosure to provide indications of available indoor map content.

An example map display system 10 that implements some or all of the techniques of this disclosure is illustrated in FIG. 1. The map display system 10 includes a computing device 12 that operates as a server. It is to be understood that the computing device 12 may be any other type of computing device, including, and not limited to, a main frame or a network of one or more operatively connected computers. The computing device 12 includes various modules, which may be implemented using hardware, software, or a combination of hardware and software. The modules include at least one central processing unit (CPU) or processor 14, a communication module (COM) 16, and a graphics processing unit (GPU) 18. The communication module 16 is capable of facilitating wired and/or wireless communication of the computing device 12 with a network 62, e.g., Ethernet, internet, etc., via any known means of wired or wireless communication, such as, 3G, 4G, GSM, WiFi, Bluetooth, etc.

The computing device 12 also includes a memory 20, which may include any type of memory capable of being incorporated with the computing device 12, including random access memory 22 (RAM), read-only memory 24 (ROM), and flash memory. Stored within the memory 20 is an operating system (OS) 26 and one or more applications or modules. The operating system 26 may be any type of operating system that may be executed on the computing device 12 and capable of working in conjunction with the processor 14 to execute the applications.

One application is a map generating route 28 configured to generate digital maps for display on a screen. In some implementations, the map generating routine 28 organizes map data in a vector graphics format into map tiles, which may be square regions of a certain size. The map generating routine 28 can provide these map tiles to client devices, such as a client computing device 38, for rendering (e.g., interpreting the vector data to generate bitmaps) and displaying on a screen. Additionally or alternatively, the map generating routine 28 provides bitmap images, such as already-rasterized map tiles, labels, metadata, etc. to client devices. The map generating routine 28 is stored in memory 20 in the form of instructions executable by the processor 14, and may include, or cooperate with, additional routines to facilitate the generation and the display of map digital maps.

With continued reference to FIG. 1, the memory 20 further stores an indoor map identifying routine 30 and an indoor map indicating routine 32. In operation, the indoor map identifying routine 30 identifies the structures located within the geographic region represented by the digital map, for which indoor map data is available. The structures can include, for example, buildings, bridges, underground stations, etc. The indoor map indicating routine 32 may cooperate with the indoor map identifying routine 30 to indicate that indoor map data is available for a structure. The indoor map indicating routine 32 may also facilitate the display of an indicator to reveal those structures displayed on the screen that include indoor map data. The indication may be included as part of the metadata transmitted to client devices along with the corresponding map data. Alternatively, the client device (e.g., the computing device 36) can generate these indications based on the information provided by the indoor map identifying routine 30.

The routines 28, 30, and 32 can retrieve external and indoor map data from a database 34, which can be implemented on a computer-readable memory in one device or multiple devices, depending on the implementation. If desired, the database 34 can store external map data separately from indoor map data.

In an example scenario, the an indoor map identifying routine 30 assembles a map tile in a vector format using map data stored in the database 34. The map tile in this example includes various map features such as road segments, parks, railroad tracks, and buildings. Each map feature can be described by a separate data structure that includes a definition of the geometry of the map feature in a vector format, an indicator of the feature type (e.g., Building, Road, River), color parameters, a texture, etc. The indoor map identifying routine 30 determines, by querying the database 34, that indoor map data is available for map feature F of type Building and is not available for the other map features of type Building included in the map tile. Accordingly, the indoor map indicating routine 32 can include an indication of availability of indoor map data in the data structure describing the map feature F. The computing device 12 transmits map data including the data structure describing the map feature F to the client computing device 36. When the user of the client computing device 36 selects the building corresponding to map feature F on the digital map (e.g., by clicking or tapping), the client computing device 36 requests and receives indoor map data for the building from the computing device 12 and provides a display of the indoor map data in any suitable format (e.g., by superimposing indoor map features on the footprint of the building, by displaying an isometric projection of the building, by generating a separate screen).

Depending on the implementation, the indication can indicate only that indoor map data is available, or additionally indicate the type and variety of the available indoor map data. For example, the indoor map indicating routine 32 can assign different values to the indication of indoor map availability depending on whether the indoor map data includes a floor plan, a listing of indoor facilities, a listing of businesses in the building, etc. Moreover, different indications can be applied to single-story and multi-story structures for which indoor map data is available.

The computing device 12 can send map data to the display system 36 via the communication module 16. As illustrated in FIG. 1, the display device 36 includes a client computing device 38 such as a computer, tablet, or mobile phone. The client computing devices 38 and 12 can operate according to a client-server scheme, according to which the client computing device 38 formats requests specifying geographic areas, transmits these requests to the computing device 12, and receives map data including the indications of indoor map data in response.

In one example embodiment, the client computing device 38 includes a processor (CPU) 40, a communication module (COM) 42, a user interface (UI) 44, and a graphic processing unit (GPU) 46. The client computing device 38 also includes a memory 48, which may include any type of memory modules capable of being incorporated with the client computing device 38, including random access memory 50 (RAM), read only memory 52 (ROM), and flash memory. Stored within the memory 48 is an operating system (OS) 54 and at least one application 56, 56', all of which may be executed by the processor 40. The operating system 54 may be any type of operating system capable of being executed by the client computing device 36. For example, the operating system may include one of several suitable mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM) (now BlackBerry), and Nokia. A graphic card interface module (GCI) 58 and a user interface module (UIM) 60 are also stored in the memory 48. The user interface 44 may include an output module, e.g., screen (not shown in FIG. 1) and an input module (not shown), e.g., a mouse, a touchpad, a keyboard, a touch screen, a voice input device. At least one of the applications 56, 56' is capable of facilitating display of the map received from the computing device 12 onto the screen.

In one example implementation, the application 56 is a web browser that controls a browser window provided by the OS 54 and displayed on the user interface 44. During operation, the web browser 56 retrieves a resource, such as a web page, from a web server (not shown) via the network 62. The resource may include content such as text, images, video, interactive scripts, etc. and describe the layout and visual attributes of the content using HTML or another a suitable mark-up language. Additionally, the resource requests that a portion of the browser window be allocated for display of map data and provides an application programming interface (API) for accessing the map data from the computing device 12. Once the computing device 36 receives the resource, the application 56 displays the received content in the browser window and executes the API to retrieve the map data and render the received data on the screen. Thus, according to this implementation, the computing device 12 specifies how map data is to be displayed. In addition, the computing device 12 may provide information relating to structures having indoor map information as well as indicators to be displayed on the screen of the computing device 36. According to this example implementation, the application 56 obtains the map data from the resource and renders the data on the screen using the API.

Generating Indications of Indoor Map Data Availability

Figure 2:
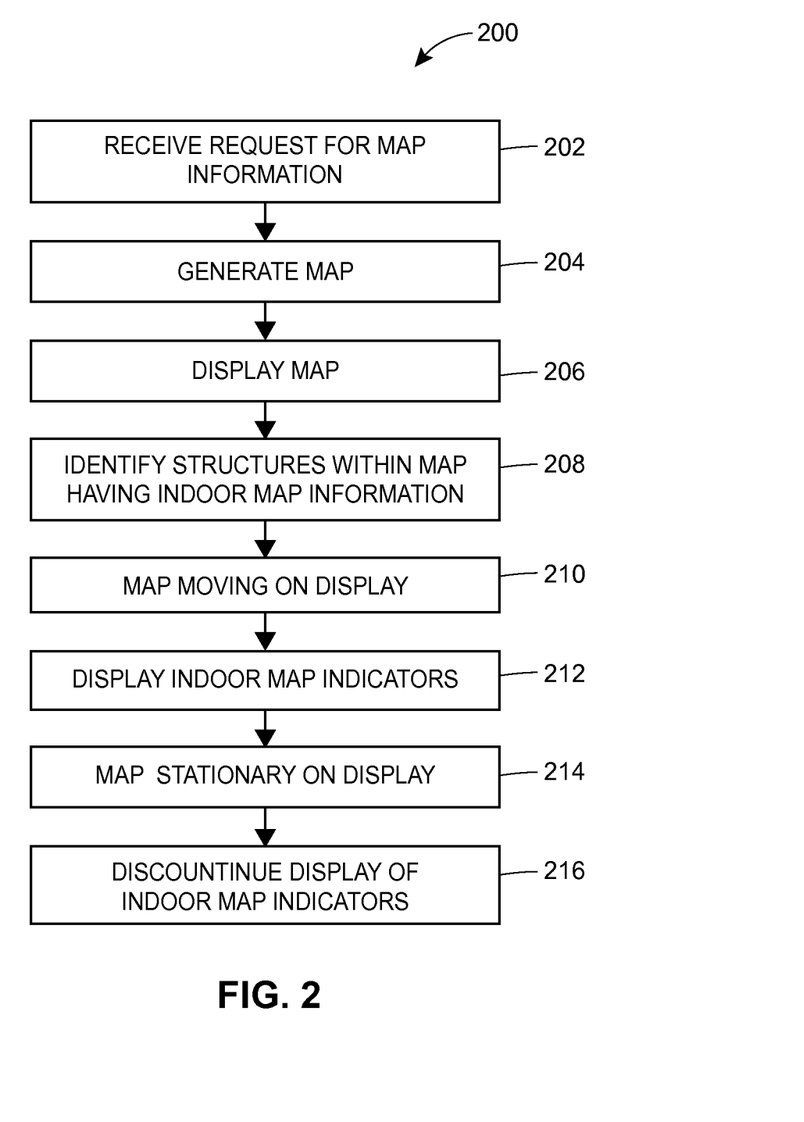
FIG. 2 is a flow diagram of an example method for displaying map information including indications of indoor map content on the user interface of a computing device.

An example method for facilitating the indication of indoor map content for a structure displayed as part of a digital map, which may be implemented by the components described in FIG. 1, is discussed next with reference to FIG. 2. A method 200 may be implemented as a computer program stored on a tangible, non-transitory computer-readable medium (such as one or several hard disk drives) and executable on one or several processors. For example, the method 200 can be implemented in the map display system 10 shown if FIG. 1 and may be part of one or more routines stored in the memory 20. Although the method 200 can be executed on individual computing devices, such as servers, personal computers (PCs), tablets, smartphones, and the like, it is also possible to implement the method in a distributed manner using several computers, e.g., using a cloud computing environment.

A request for map information is received at the computing device 12 (block 202). The request for map information may be initiated in a variety of forms. In one instance, a search request may be submitted by the user inputting a search term into a search box on the display screen of the client computing device 38. The request for map information may also be initiated by the user panning and/or zooming in and/or out of the map displayed on an area on the device 38 where the map appears, e.g., viewport, screen; thereby changing the segment of the geographic area of the map represented and made visible on the screen.

In response to the request for map information received at the computing device 12, a digital map is generated by the map generating routine (block 204). The generated digital map may include map symbols representing information corresponding to objects located within and/or near the area represented by the map, such as natural and man-made structures, and locations, e.g., buildings, rivers, streets, etc. Map information corresponding to the generated map is sent via the communication module 16 to the client computing device 38 from which the request for map data was received. The client computing device 38 receives the generated map information via the communication module 42 and the generated map data is then displayed via the CPU 40, GPU 46, UI 44, and/or UIM 60 on the screen (block 206).

Some map objects, such as structures or buildings, located in or near the geographic area may be represented by images displayed within the map. Some of the buildings may include associated indoor map information, e.g., images, of the building's interior such as a floor plan that is accessible from the computing device 12. A building having indoor map data may be identifiable by having indoor map information included within the map information of the building, e.g., metadata, (block 208). A building with an indoor map may also be identifiable by the accompanying indication included within the building's map information. The indoor map information may be stored within an electronic data collection storage component internal or external to the computing device 12, for example, the memory 20 of the server computing device 12 and/or a database 34. The indication, which is used to point out those structures having indoor map information while the map is panning, may be sent along with the map information to the computing device 38. Alternatively, or additionally, the computing device 38 may become aware of structures having indoor map information when the map information is received. The computing device 38 may then display the indication along with the associated structure when the map is displayed on the computing device. In particular, when the map displayed on the screen is stationary, the indications used to denote those structures having indoor map information are not viewable. When the map displayed on the screen is moved by panning (block 210), the indication are displayed on the map together with those associated structures having indoor map information (block 212). The map may be moved by the user utilizing the user interface, for example, stylus, mouse, finger-touch, scroll knob, keypad, etc. to "grab" the map and "drag" the map on the screen. When the map is stopped (block 214), the display of the indication on the screen is discontinued (block 216). If the map is later moved, the indication will be displayed together with the structure as the map moves on the screen.

Figure 3A:
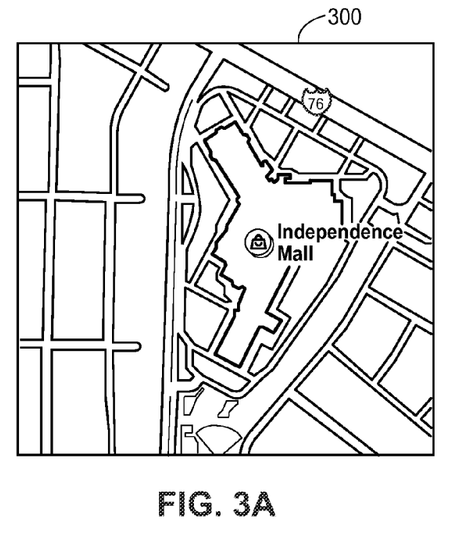
FIGS. 3A-3C depict example screenshots of a map displayed on the user interface of a computing device, where indications of indoor map content are provided when the viewport is moving.
Figure 3B:
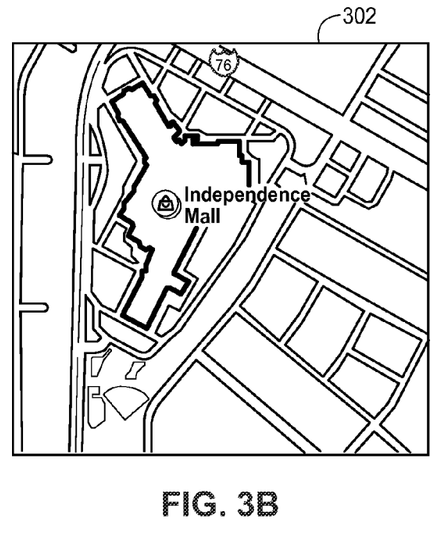
Figure 3C:
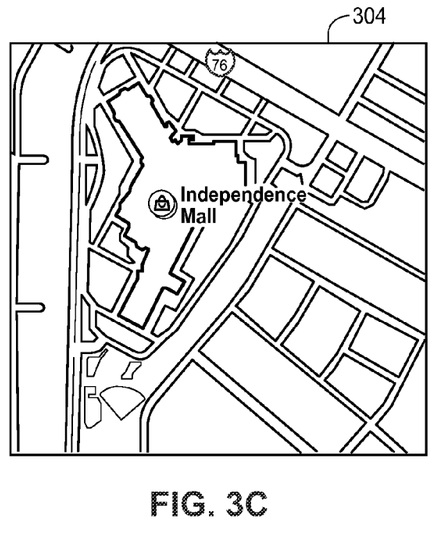

FIGS. 3A-3C depict a sequence of screenshots 300, 302, 304 of an interactive digital map displayed on the screen of the computing device such as a desktop computer. FIG. 3A illustrates a first screenshot 300 showing a map with such map elements as roads and structures. Because the map is stationary at this point (i.e., the viewport is not moving relative to the geographic area), no indications of indoor map data availability appear on the map. In FIG. 3B, the user pans the map using gestures, controls displayed on the screen, voice commands, or any other suitable techniques. As the map moves, the indication of indoor map data availability is displayed along with the digital map, as shown in the screenshot 302. The indication displayed in the example screenshot 302 is a 2.5D or 3D shadow and is displayed for Independence Mall, i.e., the structure for which indoor map data is available. In general, similar indications can be applied to multiple buildings within the viewport when indoor map data is available for multiple buildings. In the screenshot 304 depicted in FIG. 3C, the digital map has stopped moving. When the digital map stops moving, the indication of indoor map data availability is no longer displayed.

Presenting indications of indoor map data availability on a digital map can occur abruptly or gradually, depending on the implementation. Similarly, removing these indicators can occur abruptly or gradually. In one implementation, the indication may appeal instantly. In another implementation, the indication may "vanish" instantly. If gradual display or removal of the indication is implementation, the display or removal of the indication may be delayed by a certain controlled amount of time. Further, gradual display and removal of the indication may be implemented using fade-in and fade-out techniques, respectively. If the user retains control of movement of the screen, e.g., continues "grabbing" the map with the mouse or touchpad, and the map is not moving, the display of the indication(s) may continue to appear on the screen or the display of the indication(s) may be removed from the screen.

Figure 4A:
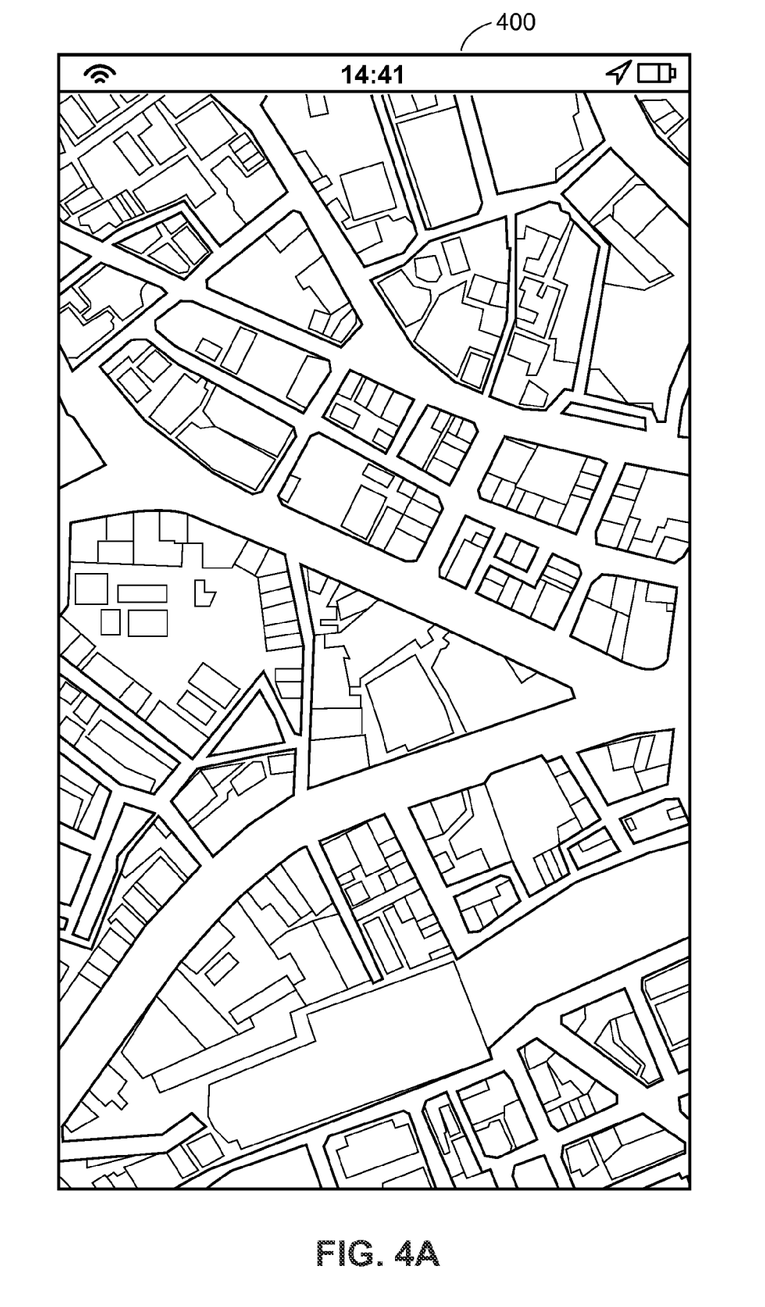
FIGS. 4A-4C depict example screenshots of a another digital map displayed on the user interface of a computing device, where indications of indoor map content are provided when the viewport is moving.
Figure 4B:
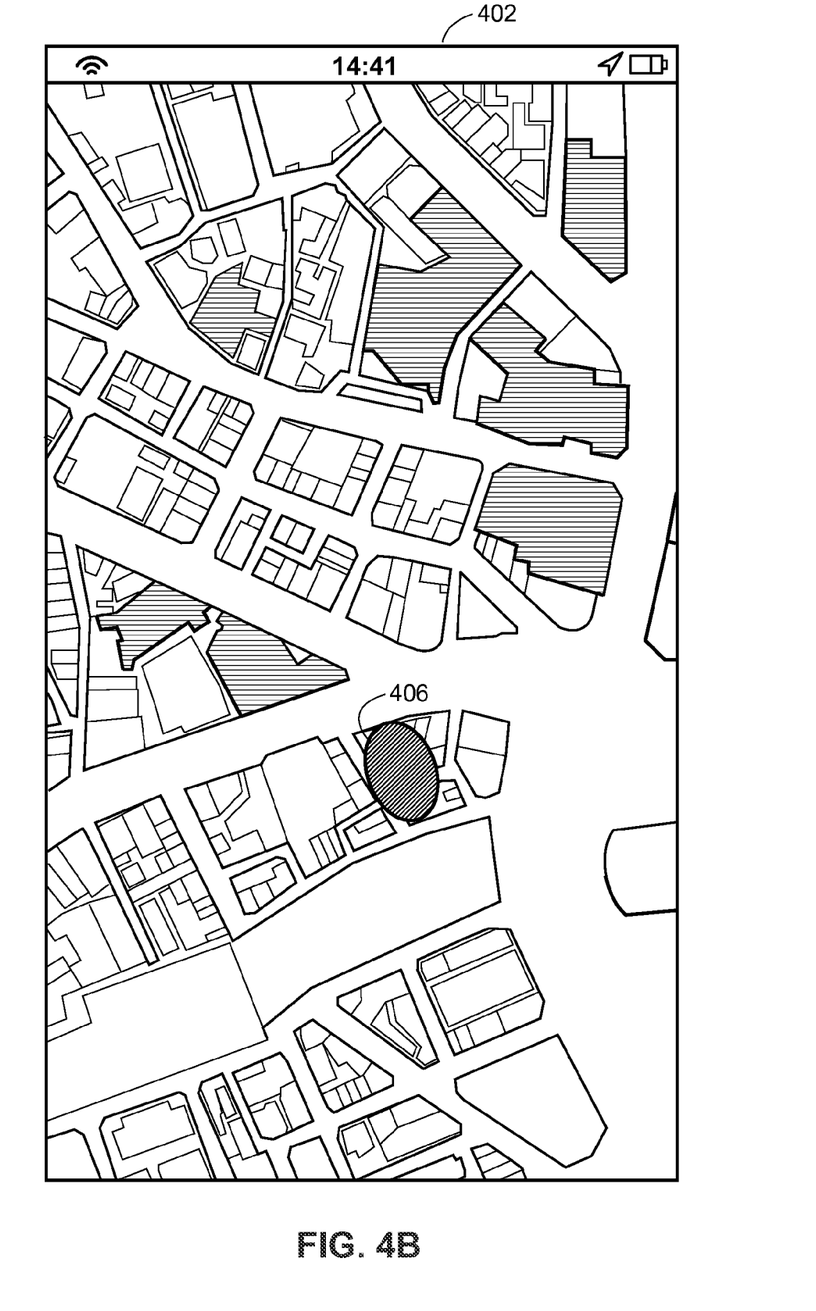
Figure 4C:
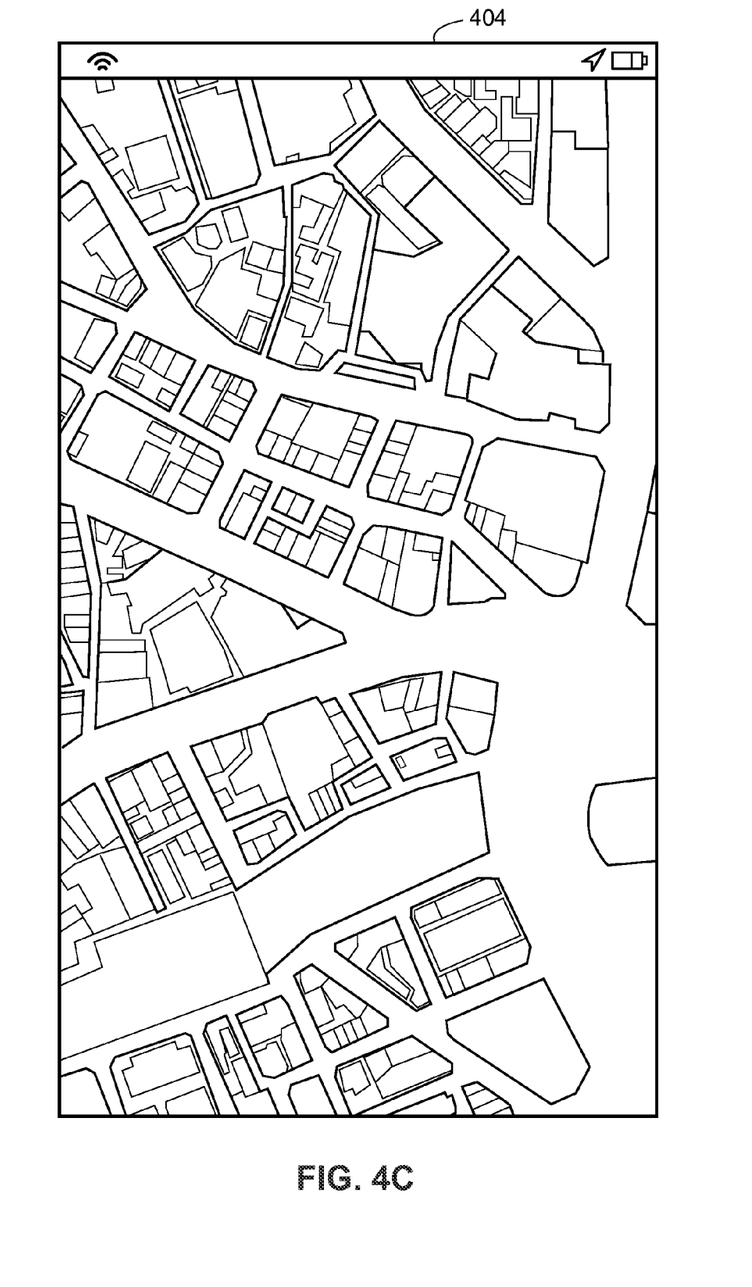
Figure 5A:
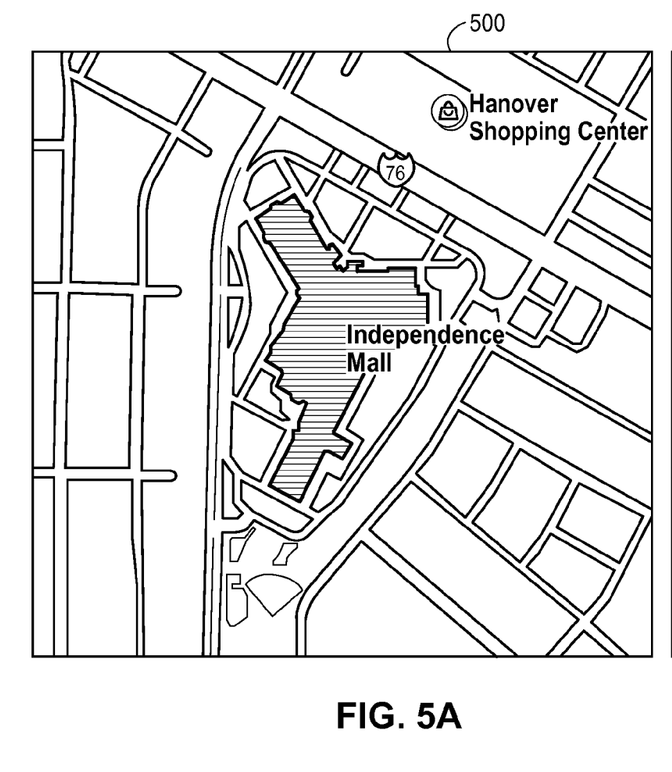
FIGS. 5A-5D depict example indications that may be displayed with a structure having indoor map information.
Figure 5B:
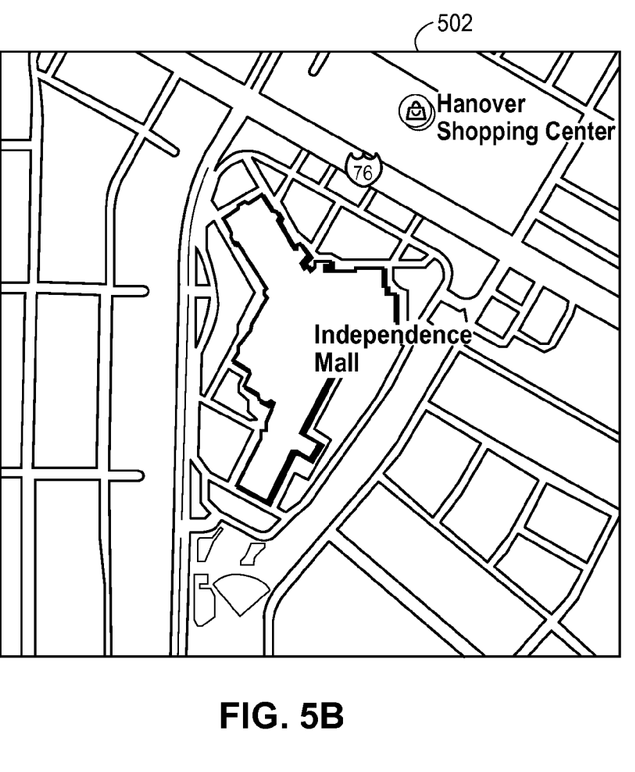
Figure 5C:
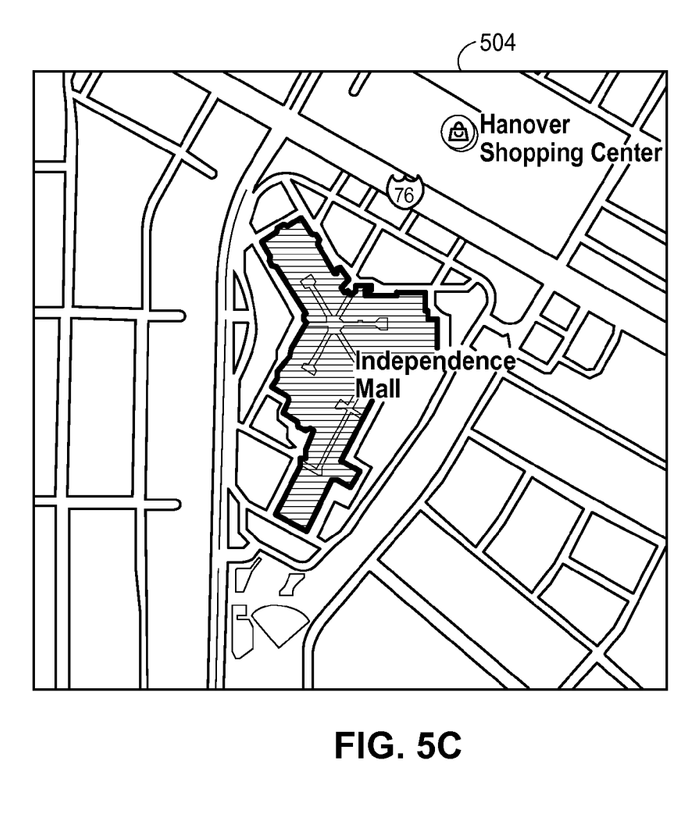
Figure 5D:
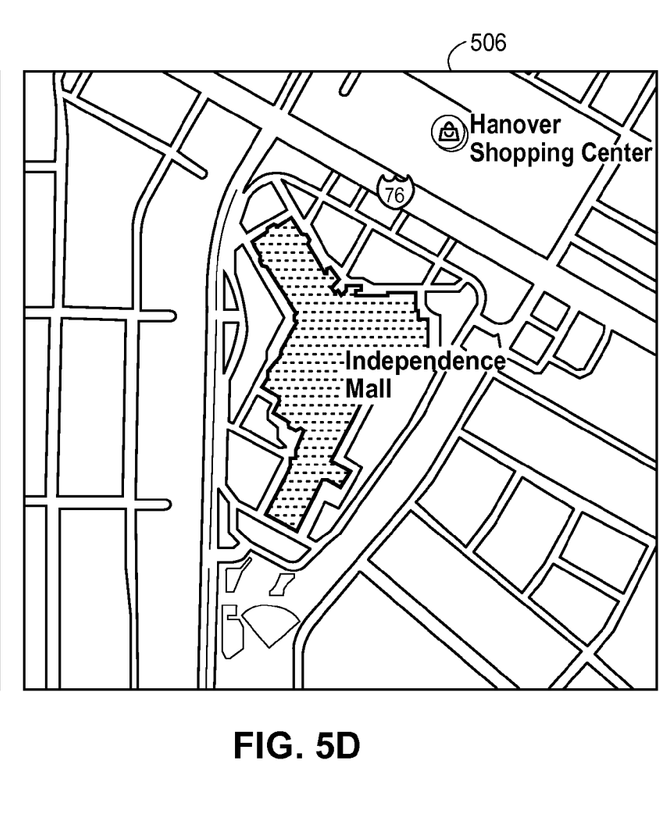

FIGS. 4A-C depict a sequence of interactive screenshots 400, 402, 404 of a digital map displayed on the screen of the computing device such as a mobile phone. FIG. 4A illustrates a first screenshot 400 showing a map having map elements including roads and structures. Because the map is stationary within the viewport of the computing device, no indications are displayed with the map. In FIG. 4B, the user pans the map. In this example, the user touches the screen as denoted by a fingerprint 406 and drags the map to the left. As the map moves, several indications of available indoor map data are displayed along with the map shown in the screenshot 402. The indication displayed in this example appears as a color or shading and is displayed with those building(s) in the screenshot 402 of FIG. 4B that include indoor map information. When the map stops moving in FIG. 4C, the indications are no longer displayed on the screenshot 404 of the computing device. If the user retains control of movement of the screen, e.g., continues "holding" the map by remaining in contact with the touchscreen of the computing device, and the map is not moving, the display of the indication(s) may continue to appear on the screen or the display of the indication(s) may be removed from the screen.

The display and/or removal of the indication(s) with the map may also be determined, in part, by consideration of another viewing parameter of the map. In particular, the display and/or removal of the indicators may be responsive to changing the elevation level for viewing the map (i.e., the zoom level) as well as the elevation level that the map is displayed. For example, indicators associated with structures having indoor map information may not be displayed with the map when the map is moving if the elevation level that the map is being viewed is above or below a specified elevation level. Similarly, the indicators associated with a structure having indoor map information may not appear with the map when the elevation level that the map is being viewed is within a specified range or outside of a specified range.

FIGS. 5A-D illustrate interactive screenshots with several example indications that may be displayed with the map on the computing device 38 as a result of the example systems and methods described herein. In the interactive screenshot 500 of FIG. 5A, the indicator may appear as a color or shading associated with the structure including the indoor map data. In the interactive screenshot 502 of FIG. 5B, the indication may appear as a shadow associated with the structure including the indoor map information. In the interactive screenshot 504 of FIG. 5C, the indication may appear as an outline & inner space associated with the structure including the indoor map information. In the interactive screenshot 506 of FIG. 5D, the indication may appear as a texture associated with the structure including the indoor map data.

Selection by the user of one of the structures associated with the indication will change the display of the map shown on the screen. For example, upon the selection of one of the buildings having indoor map information, an indoor map or a portion thereof of the selected building will be displayed on the screen. In addition, one of the features within the indoor map data displayed on the screen may also have additional information that may be denoted by an indication when the map is panned. For example, selection of a building have multiple floors may include an indicator displayed for each particular floor when the map of the indoor map information is moved. Further navigation by the user within the indoor map may include a viewing mode similar to the street-level viewing mode wherein images displayed on the screen of the computing device appear in a perspective as if the user was moving about the indoor map.

It is apparent from the description above that the user's map viewing experience can be enhanced by the display of the indicator in combination with the map while the display of the map is being moved. Additionally, while the embodiments illustrated show image selection and arrangement performed on the server side computing device, advancements in client side computing device memory capacity, computing power, and network connectivity are such that these functions are reasonably contemplated as being performed at the client side computing device in some embodiments.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a system and a process for providing indications of indoor map data availability on a computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for indicating availability of indoor map content, the method comprising:
   providing, by one or more processors, an interactive digital map of a geographic area via a viewport, wherein the viewport defines a visible portion of the digital map, and wherein the digital map includes representations of a first structure for which indoor map data is available and a second structure for which indoor map data is unavailable;
   panning, by the one or more processors, the viewport relative to the digital map in response to receiving a user request, including displaying the representations of the first structure and the second structure while the viewport is panning and when the viewport has stopped panning;
   displaying an indication that indoor map data including a floor plan is available for the first structure in response to determining that the viewport is panning, wherein the indication varies based at least on whether the first structure includes a single floor or multiple floors, and wherein no indication of available indoor map data is displayed for the second structure;
   removing the indication in response to determining, by the one or more processors, that the viewport has stopped panning.

2. The method of claim 1, wherein the indication includes one or more of:
   (i) a different color applied to the first structure,
   (ii) different shading applied to the first structure,
   (iii) a different texture applied to the first structure,
   (iv) a shadow of the first structure, and
   (v) an indicator of indoor map features.

3. The method of claim 1, further comprising:
   receiving, via a communication network, map data for generating the interactive digital map, wherein the digital map includes representations of a plurality of structures, wherein the map data indicates for which of the first and second structures indoor map data is available, wherein displaying the indication that indoor map data is available for the first structure is further in response to the map data indicating that indoor map data is available for the first structure.

4. The method of claim 1, wherein displaying the indication is further in response to determining that a zoom level at which the interactive digital map is being displayed is above a certain threshold level.

5. The method of claim 1, wherein removing the indication includes gradually fading out the indication until the indication completely disappears from the digital map.

6. The method of claim 1, wherein displaying the indication includes gradually fading in the indication on the digital map.

7. The method of claim 1, wherein removing the indication includes delaying removal of the indication until a certain period of time has elapsed after determination of movement of the viewport has stopped panning.

8. The method of claim 1, wherein displaying an indication includes delaying display of the indication until a period of time has elapsed after the viewport has started panning.

9. A non-transitory computer-readable medium storing thereon instructions for indicating availability of indoor map content that, when executed by one or more processors, cause the one or more processors to:
   provide an interactive digital map of a geographic area via a viewport that defines a visible portion of the digital map, and wherein the digital map includes representations of a first structure denoting indoor map content is available and a second structure denoting indoor map content is unavailable;
   pan the viewport relative to the digital map in response to receiving a request from a user via a touchscreen;
   display the representations of the first structure and the second structure while the viewport is panning and when the viewport has stopped panning;
   display an indication that indoor map data including a floor plan is available for the first structure in response to determining that the viewport is panning, wherein no indication of available indoor map data is displayed for the second structure;
   continue to display the representation of the first structure in response to determining that the viewport has stopped panning but the user remains in contact with the touchscreen, and
   remove the indication in response to determining that the viewport has stopped panning and the user is no longer in contact with the touchscreen.

10. The computer-readable medium of claim 9, wherein the indication includes one or more of:
    (i) color,
    (ii) shading,
    (iii) texture,
    (iv) presence of a shadow, and
    (v) indication of indoor map features.

11. The computer-readable medium of claim 9, wherein the instructions further cause the one or more processors to:
    determine a zoom level at which the digital map is being displayed, and
    display the indication when the zoom level is above a certain threshold level.

12. The computer-readable medium of claim 9, wherein the instructions further cause the one or more processors to gradually remove the displayed indication after the viewport has stopped panning.

13. The computer-readable medium of claim 9, wherein the instructions further cause the one or more processors to gradually display the indication when the viewport begins to pan.

14. The computer-readable medium of claim 9, wherein the instructions further cause the one or more processors to delay removal of the indication for a certain period of time after the viewport stops panning.

15. The computer-readable medium of claim 9, wherein the instructions further cause the one or more processors to delay display of the indication for a certain period of time after the viewport begins to pan.

16. A computing device comprising:
one or more processors;
a user interface coupled to the one or more processors; and
a memory coupled to the one or more processors and storing thereon instructions for indicating availability of indoor map content, wherein the instructions, when executed by the one or more processors, cause the computing device to:
display, via a viewport on the user interface, an interactive digital map of a geographic area, wherein the viewport defines a visible portion of the digital map, and wherein the digital map includes visual representations of a first structure for which map data is available and a second structure for which indoor map data is not available,
pan the viewport in accordance with user input received via the user interface, including displaying the representations of the first structure and the second structure while the viewport is panning and when the viewport has stopped panning;
display an indication that indoor map data including a floor plan is available for the first structure in response to determining that the viewport is panning, wherein the indication varies based at least on whether the first structure includes a single floor or multiple floors, and wherein no indication of available indoor map data is displayed for the second structure, and
remove the indication in response to determining that the viewport has stopped panning.

17. The computing device of claim 16, wherein the indication includes one or more of:
(i) a different color applied to the first structure,
(ii) different shading applied to the first structure,
(iii) a different texture applied to the first structure,
(iv) a shadow of the first structure, and
(v) an indicator of indoor map features.

18. The computing device of claim 16, wherein the instructions further cause the computing device to display the indication that indoor map data is available in response to determining that a zoom level at which the interactive digital map is being displayed is above a certain threshold level.

19. The computing device of claim 16, wherein the instructions further cause the computing device to:
detect a selection of the structure via the user interface and
provide the indoor map data on the interactive digital map in response to the selection.

20. The computing device of claim 19, wherein to provide the indoor map data, the instructions cause the computing device to display the floor plan of at least one floor of the first structure.

* * * * *